(12) United States Patent
Nakadai et al.

(10) Patent No.: US 8,639,511 B2
(45) Date of Patent: Jan. 28, 2014

(54) ROBOT, METHOD AND PROGRAM OF CORRECTING A ROBOT VOICE IN ACCORDANCE WITH HEAD MOVEMENT

(75) Inventors: Kazuhiro Nakadai, Wako (JP); Takuma Otsuka, Wako (JP); Hiroshi Okuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 12/881,812

(22) Filed: Sep. 14, 2010

(65) Prior Publication Data
US 2011/0224977 A1 Sep. 15, 2011

(30) Foreign Application Priority Data
Mar. 12, 2010 (JP) .................................. 2010-056265

(51) Int. Cl.
G10L 13/00 (2006.01)
G10L 13/02 (2013.01)
G10L 21/00 (2013.01)

(52) U.S. Cl.
USPC ........... 704/258; 704/207; 704/261; 704/266; 901/1

(58) Field of Classification Search
USPC .............. 704/205, 207, 258, 261, 266; 901/1
See application file for complete search history.

(56) References Cited

U.S. PATENT DOCUMENTS

| | | | |
|---|---|---|---|
| 4,820,232 A * | 4/1989 | Takahashi et al. | 446/178 |
| 2004/0127140 A1* | 7/2004 | Kelly et al. | 446/268 |
| 2004/0153212 A1* | 8/2004 | Profio et al. | 700/245 |
| 2005/0215170 A1* | 9/2005 | Poesch | 446/297 |
| 2006/0143006 A1* | 6/2006 | Asano | 704/238 |
| 2007/0150107 A1* | 6/2007 | Ogawa et al. | 700/245 |

FOREIGN PATENT DOCUMENTS

| | | | |
|---|---|---|---|
| JP | 2002-23775 | 1/2002 | |
| JP | 2002085858 A * | 3/2002 | A63H 3/33 |
| JP | 2005-266671 | 9/2005 | |
| JP | 2006-136963 | 6/2006 | |
| JP | 2011167820 A * | 9/2011 | |
| WO | 2005/076660 A1 | 8/2005 | |

OTHER PUBLICATIONS

Otsuka, Takuma, et al. "Voice-Awareness Control Consistent with Robot's Body Movements." RSJ 2009, Sep. 15, 2009, pp. 1-4.*
Otsuka et al, "Voice Quality Manipulation for Humanoid Robots Consistent with their Head Movements," 9th IEEE RAS International Conference on Human Robots, Dec. 7-10, 2009, Paris, France, pp. 405-410.*
Miwa et al, "Development of a New Human-like Head Robot WE-4," Proceedings of the 2002 IEEE/RSJ Intl. Conference on Intelligent Robots and Systems, Oct. 2002, pp. 2443-2448.*
Japanese Notice of Allowance for Application No. 2010-056265, 8 pages, dated Sep. 17, 2013.

* cited by examiner

Primary Examiner — James Wozniak
(74) Attorney, Agent, or Firm — Nelson Mullins Riley & Scarborough LLP; Anthony A. Laurentano

(57) ABSTRACT

A robot may include a driving control unit configured to control a driving of a movable unit that is connected movably to a body unit, a voice generating unit configured to generate a voice, and a voice output unit configured to output the voice, which has been generated by the voice generating unit. The voice generating unit may correct the voice, which is generated, based on a bearing of the movable unit, which is controlled by the driving control unit, to the body unit.

7 Claims, 4 Drawing Sheets

Empirical and theoretical $\theta_y$-gain model for the left channel

Setup for left-right balance measurement

ROBOT, METHOD AND PROGRAM OF CORRECTING A ROBOT VOICE IN ACCORDANCE WITH HEAD MOVEMENT

BACKGROUND OF THE INVENTION

1. Field of the Invention

The present invention generally relates to a robot that corrects an output voice based on a bearing of a head unit of the robot, and a method and a program of controlling the robot.

Priority is claimed on Japanese Patent Application No. 2010-056265, filed Mar. 12, 2010, the content of which is incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, there has been performed an art in which information other than a language such as a prosody and emotion information is attached to an output voice of a communication robot. By attaching the prosody or the emotion information to the output voice, the meaning of the output voice can be transmitted more accurately. Japanese Unexamined Patent Application, First Publication No. 2002-23775 discloses a method of modeling a vocal tract of a man so as to increase the expressive power in a voice synthesis.

In the prior art described above, the output voice is not changed even if the bearing of the communication robot, especially in the direction of the face of the communication robot, is changed, which can seem strange to people.

SUMMARY

A robot may include a driving control unit configured to control a driving of a movable unit that is connected movably to a body unit, a voice generating unit configured to generate a voice, and a voice output unit configured to output the voice, which has been generated by the voice generating unit. The voice generating unit may correct the voice, which is generated, based on a bearing of the movable unit, which is controlled by the driving control unit, to the body unit.

The movable unit may include a head unit, and the voice generating unit may correct the voice, which is generated using a vocal tract filter, based on the bearing in a direction of a pitch axis of the head unit.

The voice generating unit may use the vocal tract filter, which amplifies a frequency band of a signal of the voice, a sound pressure level is based on a pitch angle that corresponds to the bearing of the head unit in the frequency band. The voice generating unit may amplify the frequency band, which is based on the pitch angle, of the signal of the voice, which is generated, using the vocal tract filter.

The movable unit may include a head unit. The voice generating unit may correct a left-right ratio of an output level of the voice, which is generated, based on the bearing in a direction of a yaw axis of the head unit.

The voice generating unit may correct a left-right ratio of an output level of the voice, which is generated, based on the bearing in a direction of a yaw axis of the head unit.

A method of controlling a robot may include controlling of a driving of a movable unit that is connected movably to a body unit, generating of a voice, and outputting of the voice, which has been generated. The generating of the voice may include correcting of the voice based on a bearing of the movable unit to the body unit.

A program may control a robot including a movable unit that is connected movably to a body unit, the robot generating and outputting a voice. The program may execute a driving control step of controlling a driving of the movable unit, a voice generating step of generating the voice, and a voice output step of outputting the voice, which has been generated by the voice generating step. The voice generating step may correct the voice, which is generated, based on a bearing of the movable unit, which is controlled by the driving control step, to the body unit.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention provides an art by which a natural sounding voice, which does not seem strange to people, can be output based on a bearing of a robot.

In the robot of the present invention, a voice output unit does not output a voice that has been generated by a voice generating unit without change. The voice that has been generated by the voice generating unit is corrected based on a bearing of a movable unit to be output from the voice output unit. Therefore, the robot can output a natural sounding voice, which does not seem strange to people, based on the bearing of the movable unit without moving a position and an angle of a speaker based on the bearing of the movable unit.

In the robot of the present invention, the voice is varied based on the bearing of a head unit in a vertical direction by imitating a variation of a voice by a man. Therefore, the robot can output a more natural sounding voice.

In the robot of the present invention, a frequency band that depends on a variation of a pitch angle is changed. Therefore, the robot can output the voice effectively.

In the robot of the present invention, the voice is varied based on the bearing of the head unit in a horizontal direction. Therefore, the robot can output a more natural sounding voice.

By using a method and program of the present invention, an effect similar to the robot of the present invention can be acquired.

The present invention will be now described herein with reference to illustrative embodiments. Those skilled in the art will recognize that many alternative embodiments can be accomplished using the teaching of the present invention and that the present invention is not limited to the embodiments illustrated for explanatory purpose.

Figure 1B:
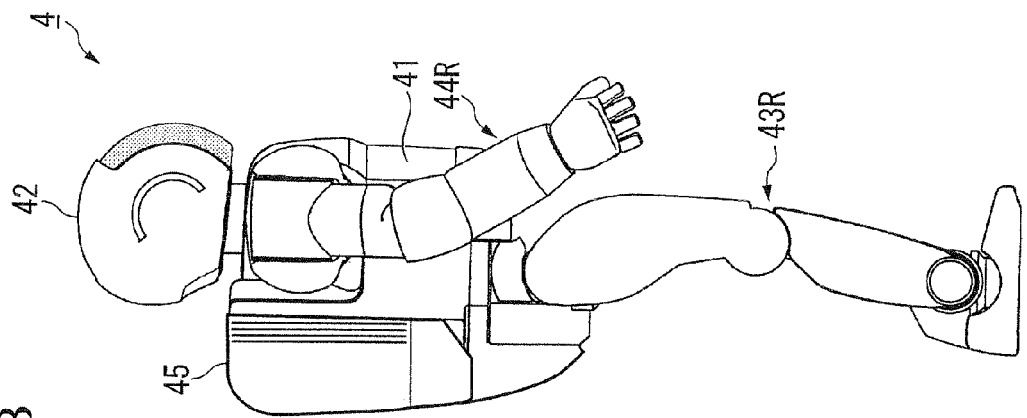
FIG. 1B is a side elevation view illustrating the robot of FIG. 1A.
Figure 1A:
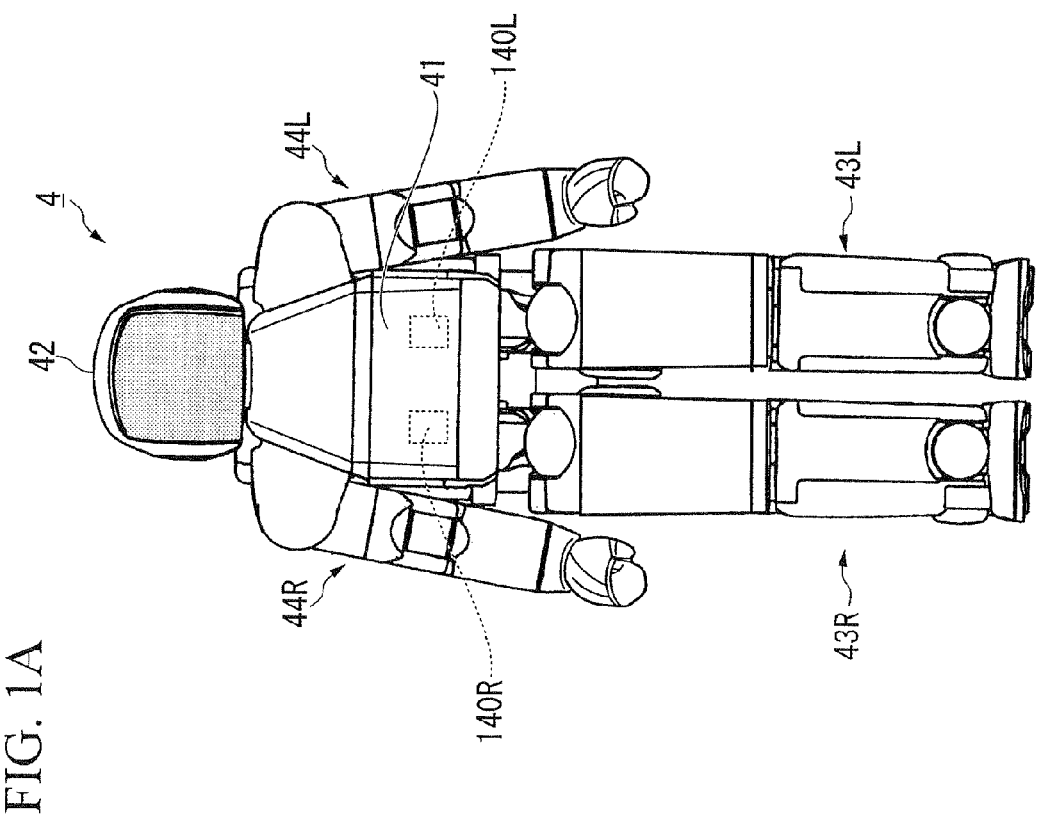
FIG. 1A is a front elevation view illustrating a robot in accordance with a preferred embodiment of the present invention.

FIG. 1A is a front elevation view illustrating a robot 4 in accordance with a preferred embodiment of the present invention. FIG. 1B is a side elevation view illustrating the robot 4. As illustrated in FIG. 1A and FIG. 1B, the robot 4 includes a body unit 41, a head unit 42, a leg unit 43L, a leg unit 43R, an arm unit 44L, an arm unit 44R, and a storage unit 45. The head unit 42, the leg unit 43L, the leg unit 43R, the arm unit 44L, and the arm unit 44R are movable units, and movably connected to the body unit 41. The head unit 42 is connected to the body unit 41 so that the head unit 42 can rotate around the pitch axis, which is in a vertical plane, and rotate around the yaw axis, which is in a horizontal plane. The storage unit 45 is attached to the body unit 41 in a style of carrying a basket on one's back. The body unit 41 includes a speaker 140L and a speaker 140R. The speaker 140L and a speaker 140R are voice output units.

Figure 2:
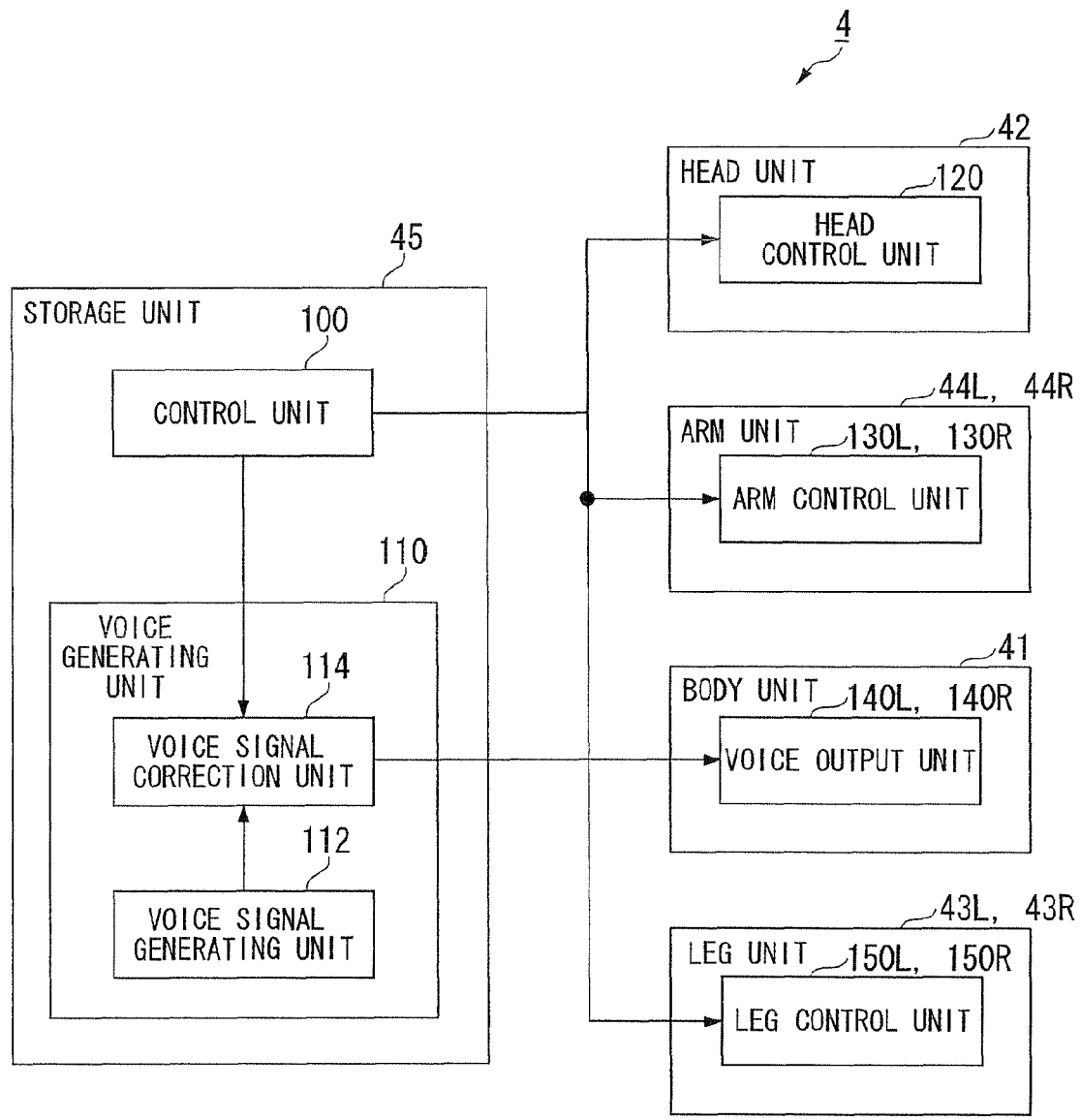
FIG. 2 is a block diagram illustrating a configuration of the robot of FIG. 1A.

FIG. 2 is a block diagram illustrating a configuration of the robot 4. As illustrated in FIG. 2, the robot 4 includes a control unit 100, a voice generating unit 110, a head control unit 120, an arm control unit 130L, an arm control unit 130R, a voice output unit 140L, a voice output unit 140R, a leg control unit 150L, and a leg control unit 150R. The control unit 100 is a driving control unit. The voice generating unit 110 is a voice generating unit. The voice output unit 140L and the voice output unit 140R are voice output units.

The head control unit 120 is disposed in the head unit 42 or at an upper portion of the body unit 41. The head control unit 120 the bearing (a rotation movement) of the head unit 42 around the pitch axis, which is in a vertical plane, based on a control signal from the control unit 100. Also, the head control unit 120 controls the bearing (a rotation movement) of the head unit 42 around the yaw axis, which is in a horizontal plane, based on the control signal from the control unit 100. By this control, a bearing of the head unit 42 to the body unit 41 can be changed in the direction of the pitch axis and in the direction of the yaw axis. Then, the head unit 42 can be shaken from side to side and up and down.

The leg control unit 150L is disposed in the leg unit 43L. The leg control unit 150R is disposed in the leg unit 43R. The leg control unit 150L and the leg control unit 150R control an operation such as a two-legged walking based on the control signal from the control unit 100. The arm control unit 130L is disposed in the arm unit 44L. The arm control unit 130R is disposed in the arm unit 44R. The arm control unit 130L and the arm control unit 130R control an operation of the arm unit 44L and the arm unit 44R during the two-legged walking based on the control signal from the control unit 100.

The control unit 100 is disposed in the storage unit 45. The control unit 100 outputs the control signal to the head control unit 120, the leg control unit 150L, the leg control unit 150R, the arm control unit 130L, and the arm control unit 130R, and controls the operation of the head unit 42, the leg unit 43L, the leg unit 43R, the arm unit 44L, and the arm unit 44R. The control unit 100 outputs information, which represents the bearing of the head unit 42 to the body unit 41, to the voice generating unit 110. The information that represents the bearing of the head unit 42 to the body unit 41 is referred to as head unit bearing information.

If the control unit 100 outputs the information, which represents the bearing of the head unit 42 to the body unit 41 after a change of the bearing or a control by the control unit 100, to the head control unit 120 as control information, then the control information is output to the voice generating unit 110 as the head unit bearing information. If the control unit 100 outputs the information, which represents a variation of the bearing of the head unit 42 to the body unit 41 between the present condition and the condition after the change of the bearing or the control by the control unit 100, to the head control unit 120 as control information, then the bearing of the head unit 42 to the body unit 41 after the change of the bearing or the control by the control unit 100 is calculated, and the result of the calculation is output to the voice generating unit 110 as the head unit bearing information.

The voice generating unit 110 is disposed in the storage unit 45 and includes a voice signal generating unit 112 and a voice signal correction unit 114. The voice signal generating unit 112 generates a voice signal corresponding to a prescribed voice. The voice signal generating unit 112 outputs the voice signal, which has been generated, to the voice signal correction unit 114. The prescribed voice is such as the voice corresponding to a language that is designated from outside, for example, by an operator of the robot 4, the voice corresponding to a result of a prescribed determination process that is selected based on an order from outside, and the voice corresponding to a detection result of various sensors that the robot 4 includes, for example, the sensor for detecting obstacles. The robot 4 can output the voice while moving the head unit 42.

The voice signal correction unit 114 receives the voice signal from the voice signal generating unit 112. The voice signal correction unit 114 receives the head unit bearing information from the control unit 100. The voice signal correction unit 114 corrects the voice signal, which has been received from the voice signal generating unit 112, based on the head unit bearing information, which has been received from the control unit 100.

Specifically, the voice signal correction unit 114 receives the head unit bearing information that includes an angle showing the bearing of the head unit 42 in the direction of the pitch axis and an angle showing the bearing of the head unit 42 in the direction of the yaw axis. Concerning the bearing of the head unit 42 in the direction of the pitch axis, the voice signal correction unit 114 corrects the voice signal, which has been received from the voice signal generating unit 112, by using a vocal tract filter that is based on a vocal tract model. If the bearing of the head unit 42 varies in the direction of the pitch axis, then a shape of the vocal tract varies and a spectral envelope of the voice signal varies. Concerning the bearing of the head unit 42 in the direction of the yaw axis, the voice signal correction unit 114 corrects a left-right ratio of an output level of the voice signal that is output to the voice output unit 140L and the voice output unit 140R. If the bearing of the head unit 42 varies in the direction of the yaw axis, then the shape of the vocal tract does not change and adjusting the left-right ratio of the output level of the voice signal is sufficient. The vocal tract filter based on the vocal tract model, the left-right ratio of the output level of the voice signal, the correction based on the bearing of the head unit 42 in the direction of the pitch axis, and the correction based on the bearing of the head unit 42 in the direction of the yaw axis will be described below.

The voice signal correction unit 114 outputs the voice signal that has been corrected or the voice signal from the voice signal generating unit 112 based on the head unit bearing information to the voice output unit 140L and the voice output unit 140R.

The voice output unit 140L and the voice output unit 140R are disposed in the body unit 41, as described above. The voice output unit 140L and the voice output unit 140R receives the voice signal that has been generated by the voice generating unit 110 to output a voice to the exterior. The voice signal has been generated by the voice signal generating unit 112 or corrected by the voice signal correction unit 114.

Figure 3A:
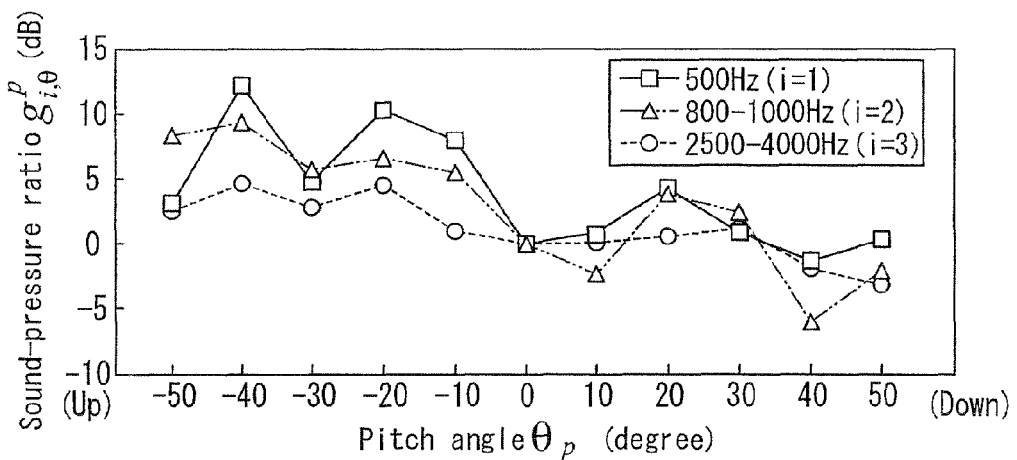
FIG. 3A is a graph explaining a content related to a correction by a voice signal correction unit of the robot of FIG. 1A.
Figure 3B:
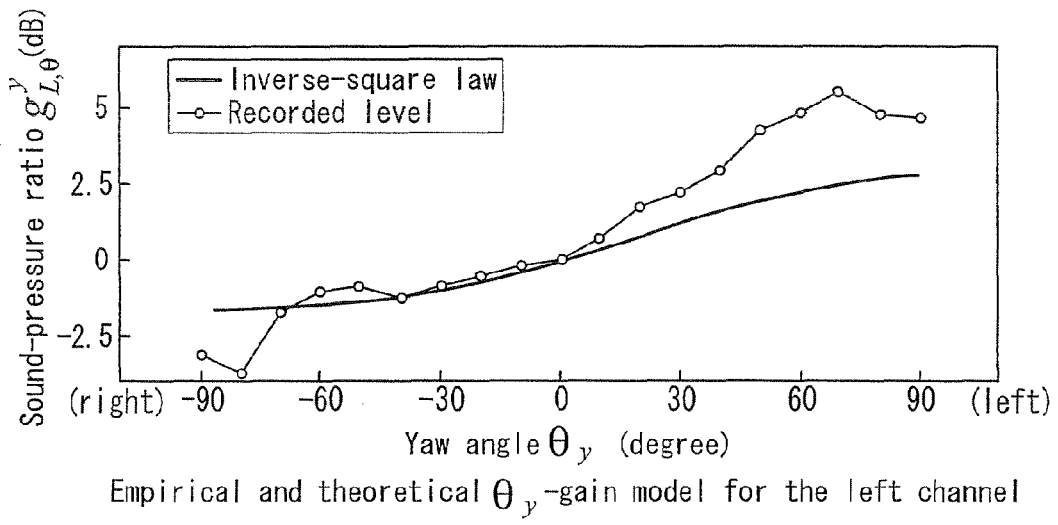
FIG. 3B is a graph explaining a content related to the correction by the voice signal correction unit of the robot of FIG. 1A.
Figure 3C:
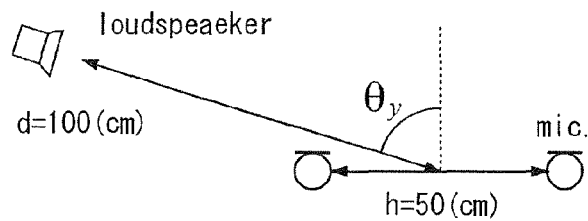
FIG. 3C is a view explaining a content related to the correction by the voice signal correction unit of the robot of FIG. 1A.
Figure 4:
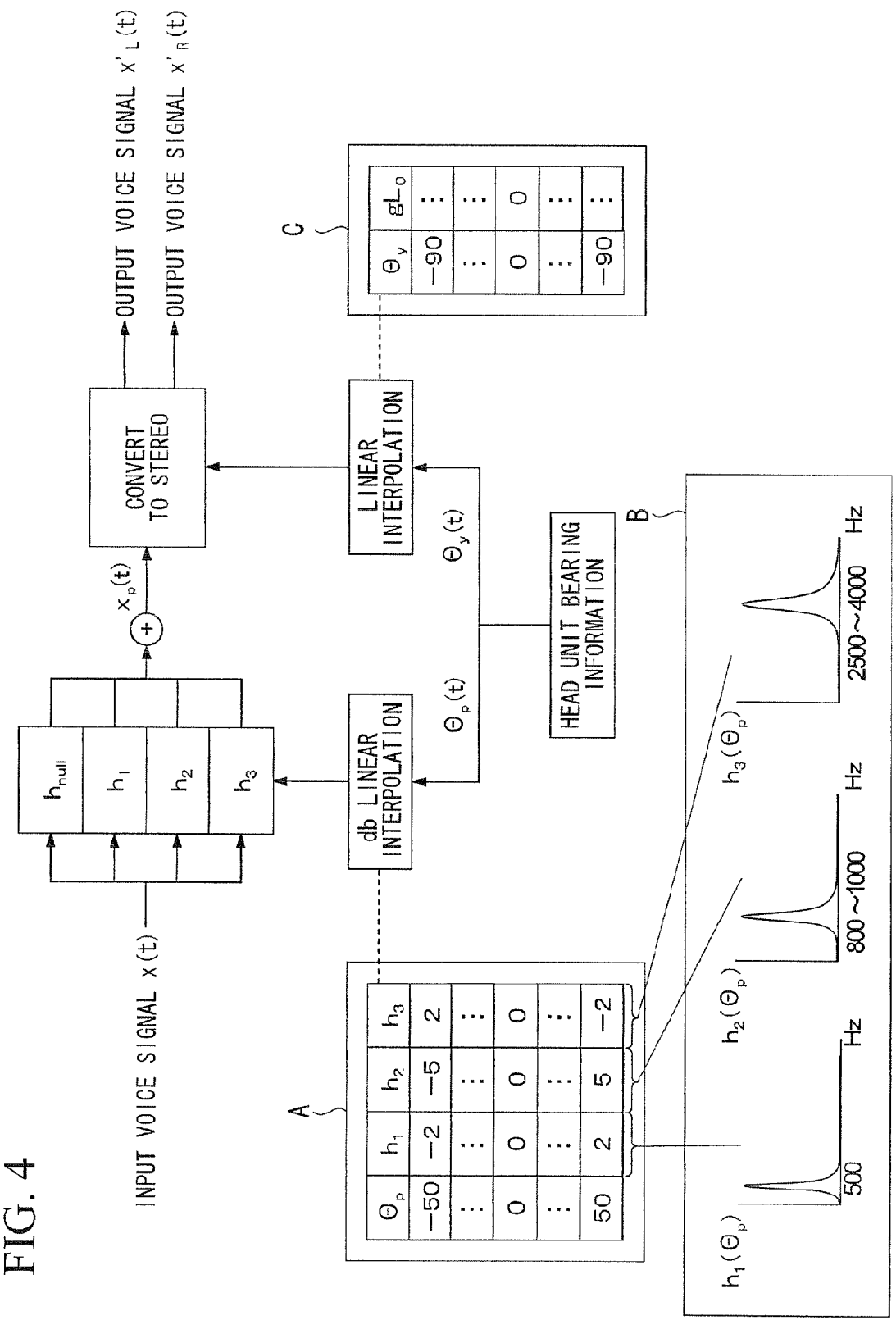
FIG. 4 is a view explaining the correction by the voice signal correction unit of the robot of FIG. 1A.

Details of the voice signal correction unit 114 will be described below. FIG. 3A, FIG. 3B and FIG. 3C are graphs explaining a content related to the correction by the voice signal correction unit 114. FIG. 4 is a view explaining the correction by the voice signal correction unit 114.

Description of the Vocal Tract Filter Based on the Vocal Tract Model

The vocal tract filter is modeled as $H(\theta_p)$, while $\theta_p$ is an angle of the head unit 42 in the direction of the pitch axis. In the preferred embodiment of the present invention, the vocal tract filter $H(\theta_p)$ is modeled by examining the voice of a man. Specifically, the head of an examinee is varied (by 10 degrees) between 50 degrees in a downward direction and 50 degrees in an upward direction, and each voice corresponding to each pitch angle $\theta_p$ is recorded having the same volume. The recording is performed in an anechoic room by using a close-talking microphone. As a result, the vocal tract filter $H(\theta_p)$ is modeled. More specifically, a sweep sound for 10 seconds that is made by producing a vowel "a" and has a basic frequency between 201 Hz and 523 Hz is recorded. Next, the voice signal of the recorded voice is analyzed by using one-third octave-band analysis, and a sound pressure level ratio is calculated by using a point of each frequency band which pitch angle is 0 degrees as a reference point.

The frequency band of the voice signal that is corrected based on the pitch angle $\theta_p$ is the frequency band in which the sound pressure level varies significantly based on the variation of the pitch angle $\theta_p$. Specifically, three frequency bands i.e. 500 Hz, between 800 Hz and 1,000 Hz, and between 2,500 Hz and 4,000 Hz are used in the frequency bands. In these three frequency bands, the sound pressure level varies significantly based on the variation of the pitch angle $\theta_p$ as illustrated in FIG. 3A. The frequency band includes formants of almost all of the vowels.

The horizontal axis of FIG. 3A represents the pitch angle $\theta_p$ and "Up" represents the upward direction and "Down" represents the downward direction. The vertical axis of FIG. 3A represents the sound pressure ratio corresponding to each pitch angle $\theta_p$, which is calculated by using a point of each frequency band which pitch angle is 0 degrees as a reference point, that is, a gain $g^P_{i,\theta}$ dB. As illustrated in FIG. 3A, the gain $g^P_{i,\theta}$ is large when the examinee turns up and is small when the examinee turns down. If the examinee is a woman, the result is the same.

Description of the Left-Right Ratio of the Output Level of the Voice Signal

The correction of the left-right ratio of the output level of the voice signal based on the yaw angle $\theta_y$ is performed by using a model illustrated in FIG. 3B. FIG. 3B is a graph illustrating the sound pressure ratio based on the yaw angle $\theta_y$. The horizontal axis of FIG. 3B represents the yaw angle $\theta_y$ and the unit is degree. A minus value of the yaw angle represents a right direction and a plus value of the yaw angle represents a left direction. The vertical axis of FIG. 3B represents the ratio of the difference between the sound pressure level of the left channel and the sound pressure level of the right channel, which is calculated by using the difference between the sound pressure level of the left channel and the sound pressure of the right channel when the yaw angle is zero as the reference point, that is a gain $g^y_{L,\theta}$ dB. In FIG. 3B, theoretical values and measured values are illustrated. In the preferred embodiment of the present invention, the measured values, which are more affected by the variation of the yaw angle $\theta_y$, are used so that the variation of the direction of the face can be represented clearly.

The measurement value illustrated in FIG. 3B can be acquired by measuring an impulse response of each microphone "mic." in the anechoic room as illustrated in FIG. 3C. The yaw angle $\theta_y$ illustrated in FIG. 3C is set to 0 degrees at the center portion that is in a direction of a dashed line and the left direction represents a plus value of the yaw angle to be consistent with FIG. 3B.

Correction Based on the Bearing in the Direction of the Pitch Axis and the Yaw Axis The voice signal correction unit 114 corrects the voice signal, which is received from the voice signal generating unit 112, that is an input voice signal x(t) based on the pitch angle $\theta_p$ of the head unit 42 and then based on the yaw angle $\theta_y$, of the head unit 42.

First, for correction based on the pitch angle $\theta_p$, the voice signal correction unit 114 resolves the input voice signal x(t) into a $\theta_p$-dependent element $x_i(t)$, which depends on the pitch angle $\theta_p$, and a $\theta_p$-independent element $x_{NULL}(t)$, which does not depend on the pitch angle $\theta_p$. Here, 'i' of the $\theta_p$-dependent element $x_i(t)$ represents an index of the frequency band to be corrected. The input voice signal $x_1(t)$ is 500 Hz, the input voice signal $x_2(t)$ is between 800 Hz and 1,000 Hz, and the input voice signal $x_3(t)$ is between 2,500 Hz and 4,000 Hz.

Specifically, the voice signal correction unit 114 calculates the $\theta_p$-dependent element $x_i(t)$ based on the equation (1) and calculates the $\theta_p$-independent element $x_{NULL}(t)$ based on the equation (2).

$$x_i(t)=(x*h_i)(t) \quad (1)$$

$$x_{NULL}(t)=(x*h_{NULL})(t) \quad (2)$$

Here, * represents a convolution operation. In the equation (1), $h_i$ represents a band pass filter that transmits the $\theta_p$-dependent element $x_i(t)$ that includes the frequency bands of 500 Hz, between 800 Hz and 1,000 Hz, and between 2,500 Hz and 4,000 Hz. Also $x_{NULL}(t)$ is equal to the input voice signal x(t) minus the $\theta_p$-dependent element $x_i(t)$. The gain of the frequency response corresponding to $h_{NULL}$ is zero at the frequency of 500 Hz, between 800 Hz and 1,000 Hz, and between 2,500 Hz and 4,000 Hz. The gain of the frequency response corresponding to $h_{NULL}$ is 1 at the center frequency of one-third octave-band except the frequency of 500 Hz, between 800 Hz and 1,000 Hz, and between 2,500 Hz and 4,000 Hz.

Next, concerning the $\theta_p$-dependent element $x_i(t)$, the voice signal correction unit 114 calculates a gain $g^P_i(t)$ of the i-th frequency band at the pitch angle $\theta_p(t)$ based on the equation (3).

$$g^P_i(t) = \frac{g^P_{i,\theta_m}(\theta_{m+1} - \theta_p(t)) + g^P_{i,\theta_{m+1}}(\theta_p(t) - \theta_m)}{10} \quad (3)$$

In the equation (3), the angle $\theta_m$ and the angle $\theta_{m+1}$ are based on the pitch angle $\theta_p(t)$, which represents the bearing of the head unit 42 in the direction of the pitch axis, that are included in the head unit bearing information received from the control unit 100. Specifically, the angle $\theta_m$ and the angle $\theta_{m+1}$ are calculated from the pitch angle $\theta_p(t)$ based on the equations (4) and (5).

$$\theta_{m+1}=(\lfloor\theta_p(t)/10\rfloor+1)\times10 \quad (4)$$

$$\theta_m=(\lfloor\theta_p(t)/10\rfloor)\times10 \quad (5)$$

Here, $\lfloor \ \rfloor$ represents a floor function. For example, if $\theta_p(t) = 35$ degrees, then $\theta_{m+1} = 40$ degrees and the angle $\theta_m = 30$ degrees.

Concerning the $\theta_p$-dependent element $x_i(t)$, the voice signal correction unit 114 linearly-interpolates and amplifies a spectral envelope model corresponding to the gain of each pitch angle $\theta_p(t)$ of FIG. 3A with dB by 10 degrees as shown in the equations (4) and (5). The spectral envelope model is shown as A and B of FIG. 4.

Next, the voice signal correction unit 114 amplifies the $\theta_p$-dependent element $x_i(t)$ based on the equation (6).

$$x_{i,g}(t) = x_i(t) \times 10^{\frac{g_i^P(t)}{10}} \quad (6)$$

Next, the voice signal correction unit 114 synthesizes the $\theta_p$-dependent element $x_i(t)$ and the $\theta_p$-independent element $x_{NULL}(t)$ based on the equation (7) to calculate a monaural signal $x_p$ that is corrected based on the pitch angle $\theta_p(t)$.

$$x_p(t) = x_{NULL}(t) + \sum_{i=1}^{3} x_{i,g}(t) \quad (7)$$

As described above, the voice signal correction unit 114 corrects the voice signal $x(t)$, which has been generated by the voice signal generating unit 112, based on the pitch angle $\theta_p$, which represents the bearing of the head unit 42 in the direction of the pitch axis, by using the vocal tract filter of the equations (1), (2), ... and (7). The vocal tract filter is in the time domain and made of the vocal tract filter $H(\theta_p)$ that is represented in the frequency domain.

Next, the voice signal correction unit 114 generates a stereo signal $x_{ste}$ from the monaural signal $x_p$ so as to correct the voice signal based on the yaw angle $\theta_y$. The stereo signal $x_{ste}$ includes a left channel signal $x_L(t)$ and a right channel signal $x_R(t)$.

Next, the voice signal correction unit 114 calculates a gain $g^P_L(t:\theta_y(t))$ of the left channel signal $x_L(t)$ corresponding to the yaw angle $\theta_y$ based on the equation (8). That is, the voice signal correction unit 114 corrects the output level ratio between the left channel signal $x_L(t)$ and the right channel signal $x_R(t)$ based on the bearing of the head unit 42 in the direction of the yaw axis.

$$g_L^y(t:\theta_y(t)) = \frac{g^y_{\theta_n}(\theta_{n+1} - \theta_y(t)) + g^y_{\theta_{n+1}}(\theta_y(t) - \theta_n)}{10} \quad (8)$$

In the equation (8), the angle $\theta_n$ and the angle $\theta_{n+1}$ are based on the yaw angle $\theta_y(t)$ that represents the bearing of the head unit 42 in the direction of the yaw axis which is included in the head unit bearing information received from the control unit 100. Specifically, the angle $\theta_n$ and the angle $\theta_{n+1}$ are calculated by the equations (9) and (10) based on the yaw angle $\theta_y(t)$.

$$\theta_{n+1} = (\lfloor \theta_y(t)/10 \rfloor + 1) \times 10 \quad (9)$$

$$\theta_n = (\lfloor \theta_y(t)/10 \rfloor) \times 10 \quad (10)$$

Here, $\lfloor \ \rfloor$ represents the floor function. For example, if $\theta_y(t) = 35$ degrees, then $\theta_{n+1} = 40$ degrees and the angle $\theta_n = 30$ degrees.

The gain of the left channel signal $x_L(t)$ and the gain of the right channel signal $x_R(t)$ are symmetric as shown in the equation (11). Therefore, the voice signal correction unit 114 calculates a gain $g^P_R(t:\theta_y(t))$ of the right channel signal $x_R(t)$ corresponding to the yaw angle $\theta_y(t)$.

$$g_R^y(t:\theta_y(t)) = g_L^y(t:-\theta_y(t)) \quad (11)$$

That is, the voice signal correction unit 114 linearly-interpolates and amplifies a spectral envelope model corresponding to the gain of each yaw angle $\theta_y(t)$ of FIG. 3C by 10 degrees as shown in the equations (9) and (10). The spectral envelope model is shown as C of FIG. 4.

The voice signal correction unit 114 amplifies the left channel signal $x_L(t)$ based on the equation (12) to generate a left channel output voice signal $x'_L(t)$, and outputs the left channel output voice signal $x'_L(t)$ to the voice output unit 140L. The voice signal correction unit 114 amplifies the right channel signal $x_R(t)$ based on the equation (13) to generate a right channel output voice signal $x'_R(t)$, and outputs the right channel output voice signal $x'_R(t)$ to the voice output unit 140R.

$$x'_L(t) = x_L(t) \times 10^{\frac{g_L^P(t)}{10}} \quad (12)$$

$$x'_R(t) = x_R(t) \times 10^{\frac{g_R^P(t)}{10}} \quad (13)$$

As described above, the voice signal correction unit 114 corrects the left channel signal $x_L(t)$ and the right channel signal $x_R(t)$ to generate the left channel output voice signal $x'_L(t)$ and the right channel output voice signal $x'_R(t)$ based on the yaw angle $\theta_y(t)$ that represents the bearing of the head unit 42 in the direction of the yaw axis. That is, the voice signal correction unit 114 corrects the output level ratio of the left channel signal $x_L(t)$ and the right channel signal $x_R(t)$.

As described above, in the preferred embodiment of the present invention, the voice generated by the voice generating unit is not output from the voice output unit as it is. The voice generated by the voice generating unit is corrected based on the bearing of the movable unit and then output from the voice output unit. Therefore, the robot can output a natural sounding voice, which does not seem strange to people, based on the bearing of the movable unit. The voice is varied by imitating the variation of the voice of a man. The voice is varied based on the bearing of the head unit 42 not only in the vertical direction but also in the horizontal direction. Therefore, the robot can output a more natural sounding voice.

The voice signal is corrected based on the bearing in the direction of the pitch axis by limiting the frequency of the correction target to a prescribed frequency based on an experimental result. Therefore, the amount of the calculation in performing the correction can be reduced effectively.

In the preferred embodiment of the present invention described above, the control unit 100 outputs the head unit bearing information to the voice signal correction unit 114. That is, the voice signal correction unit 114 receives the head unit bearing information from the control unit 100. The head unit bearing information represents the bearing of the head unit 42 to the body unit 41. The voice signal correction unit 114 refers to the head unit bearing information when correcting the voice signal. But the way of the voice signal correction unit 114 receiving the head unit bearing information is not limited to the above way. For example, the robot 1 may include a measurement unit, which is not illustrated in the figure, that measures the bearing of the head unit 42 to the body unit 41, and the voice signal correction unit 114 may use the measurement result of the measurement unit as the head unit bearing information.

In the preferred embodiment of the present invention described above, the voice signal correction unit 114 corrects the voice signal based on the head unit bearing information. However, the method of the voice signal correction unit 114 correcting the voice signal is not limited to the above described method. For example, the voice signal correction unit 114 may correct the voice signal based on information including the bearing of the leg unit 43L, the leg unit 43R, the arm unit 44L, and the arm unit 44R to the body unit 41.

A program that executes various processing of the robot 4 in accordance with the preferred embodiment of the present invention may be stored in a computer-readable recording medium. A computer system may read and execute the program that is stored in the recording medium to perform the various processing described above in accordance with the robot 4 of the preferred embodiment of the present invention. The computer system may include an OS or hardware such as peripheral device etc. Also, the computer system may employ a WWW (World Wide Web) system. With such an arrangement, the computer system includes a homepage providing circumstances or homepage display environment.

Further, the computer readable recording medium refers to a writable nonvolatile memory such as a flexible disk, a magneto-optical disk, a ROM, or a flash memory, a portable medium such as a CD-ROM, and a memory device such as a hard disk incorporated in a computer system.

In addition, the "computer readable recording medium" includes a medium storing a program for a predetermined time period, such as a volatile memory (for example, dynamic random access memory (DRAM)) incorporated in the computer system which becomes a server or a client in a case where the program is transmitted via a network such as the Internet, or a communication line such as a telephone line.

Further, the above-mentioned program may be transmitted from the computer system which stores the program in the memory device or the like via a transmission medium, or may be transmitted by a transmitted wave through the transmission medium to another computer system. In this case, the "transmission medium" for transmitting the program refers to a medium having a function for transmitting information like a network (communication network) such as the Internet, or a communication line (communication wire) such as a telephone line.

Further, the above-mentioned program may be a program for realizing part of the above-mentioned function. Moreover, there may be used a program that can realize the above-mentioned function by a combination of a program already recorded in the computer system, that is, a differential file (differential program).

In the above descriptions of the present invention, the bearing of the robot represents the attitude of the robot. The bearing of the movable unit is equal to the bearing of the robot.

As used herein, the following directional terms "forward, rearward, above, downward, vertical, horizontal, below, and transverse" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, section or part of a device including hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," "nearly", and "approximately" as used herein mean a reasonable amount of deviation of the modified term such that the end result is not significantly changed. For example, these terms can be construed as including a deviation of at least ±5 percents of the modified term if this deviation would not negate the meaning of the word it modifies.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the claims.

What is claimed is:

1. A robot comprising:
a driving control unit configured to control a driving of a movable unit that is connected movably to a body unit, wherein the movable unit includes a head unit;
a voice generating unit configured to generate a voice; and
a voice output unit configured to output the voice, which has been generated by the voice generating unit,
wherein the voice generating unit corrects the voice, which is generated, based on a bearing of the movable unit, which is controlled by the driving control unit, to the body unit, and
wherein the voice generating unit corrects the voice, which is generated using a vocal tract filter, based on the bearing in a direction of a pitch axis of the head unit.

2. The robot according to claim 1, wherein
the voice generating unit uses the vocal tract filter, which amplifies a frequency band of a signal of the voice, a sound pressure level is based on a pitch angle that corresponds to the bearing of the head unit in the frequency band, and
the voice generating unit amplifies the frequency band, which is based on the pitch angle, of the signal of the voice, which is generated, using the vocal tract filter.

3. The robot according to claim 2, wherein
the voice generating unit corrects a left-right ratio of an output level of the voice, which is generated, based on the bearing in a direction of a yaw axis of the head unit.

4. The robot according to claim 1, wherein
the voice generating unit corrects a left-right ratio of an output level of the voice, which is generated, based on the bearing in a direction of a yaw axis of the head unit.

5. A robot comprising:
a driving control unit configured to control a driving of a movable unit that is connected movably to a body unit, wherein the movable unit includes a head unit:
a voice generating unit configured to generate a voice; and
a voice output unit configured to output the voice, which has been generated by the voice generating unit,
wherein the voice generating unit corrects the voice, which is generated, based on a bearing of the movable unit, which is controlled by the driving control unit, to the body unit, and
wherein the voice generating unit corrects a left-right ratio of an output level of the voice, which is generated, based on the bearing in a direction of a yaw axis of the head unit.

6. A method of controlling a robot comprising:
controlling of a driving of a movable unit that is connected movably to a body unit;
generating of a voice; and
outputting of the voice, which has been generated,
wherein the generating of the voice comprises correcting of the voice based on a bearing of the movable unit to the body unit, and
wherein the generating of the voice comprises correcting of the voice, which is generated using a vocal tract filter, based on the bearing in a direction of a pitch axis of the head unit.

7. A method of controlling a robot comprising:
controlling of a driving of a movable unit that is connected movably to a body unit, wherein the movable unit is a head unit;
generating of a voice; and
outputting of the voice, which has been generated,
wherein the generating of the voice comprises correcting of the voice based on a bearing of the movable unit to the body unit, and
wherein the generating of the voice comprises correcting of a left-right ratio of an output level of the voice, which is generated, based on the bearing in a direction of a yaw axis of the head unit.

* * * * *